United States Patent
Bancel et al.

(10) Patent No.: US 7,747,935 B2
(45) Date of Patent: Jun. 29, 2010

(54) METHOD AND DEVICE FOR SECURING THE READING OF A MEMORY

(75) Inventors: Frédéric Bancel, Lamanon (FR); Nicolas Berard, Trets (FR); David Hely, Gardanne (FR)

(73) Assignee: STMicroelectronics SA, Montrouge (FR)

( * ) Notice: Subject to any disclaimer, the term of this patent is extended or adjusted under 35 U.S.C. 154(b) by 214 days.

(21) Appl. No.: 11/954,606

(22) Filed: Dec. 12, 2007

(65) Prior Publication Data
US 2008/0228989 A1 Sep. 18, 2008

(30) Foreign Application Priority Data
Dec. 18, 2006 (FR) .................................. 06 10990

(51) Int. Cl.
G06F 7/02 (2006.01)
H03M 13/00 (2006.01)
(52) U.S. Cl. ......................................... 714/819; 714/54
(58) Field of Classification Search ........................ None
See application file for complete search history.

(56) References Cited

U.S. PATENT DOCUMENTS 6,247,151 B1    6/2001    Poisner
6,438,719 B1 *  8/2002    Lindberg et al. ............ 714/720
6,981,176 B2 * 12/2005    Fruehling et al. ............ 714/11
2004/0210737 A1 10/2004   Ness
2007/0043993 A1 * 2/2007  Romain et al. ............... 714/736

FOREIGN PATENT DOCUMENTS

DE         10251477 A1    5/2004

OTHER PUBLICATIONS

Hagai Bar-El et al., "The Sorcerer's Apprentice Guide to Fault Attacks," URL: http://web.archive.org/web/20041016071838/eprint.iacr.org/2004/100, dated May 7, 2004.

* cited by examiner

*Primary Examiner*—Christine T Tu
(74) *Attorney, Agent, or Firm*—Lisa K. Jorgenson; Robert Iannucci; Seed IP Law Group PLLC (57) ABSTRACT

A method reads a datum saved in a memory by selecting an address of the memory in which the datum to be read is saved, reading the datum in the memory at the selected address, saving the datum read in a storage space, and when the memory is not being accessed by a CPU, reading the datum in the memory, reading the datum saved in the storage space, and activating an error signal if the datum read in the memory is different from the datum saved. The method can be applied particularly to the protection of smart card integrated circuits.

18 Claims, 4 Drawing Sheets

METHOD AND DEVICE FOR SECURING THE READING OF A MEMORY

BACKGROUND

1. Technical Field

The present invention relates to the protection of integrated circuits against attacks by error injection, and particularly to the protection of integrated circuits present in smart cards.

The present invention relates more particularly to a method for securing the reading of a memory.

2. Description of the Related Art

Figure 1:
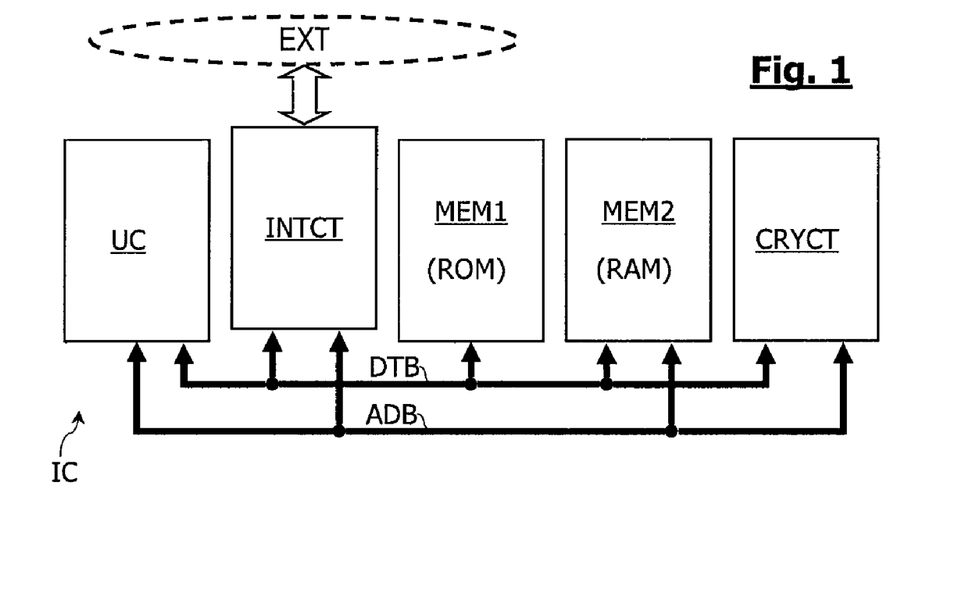
FIG. 1 previously described represents an integrated circuit in block form.

FIG. 1 shows an integrated circuit IC for a smart card or an electronic tag. The integrated circuit IC comprises a microprocessor central processing unit UC, one or more non-volatile memories MEM1 (ROM, EEPROM, FLASH, etc.), a volatile memory MEM2 (RAM), an encryption circuit CRYCT enabling the integrated circuit to authenticate itself during a transaction, and an interface circuit INTCT enabling it to communicate with external smart card or electronic tag readers (EXT). The central processing unit UC, the memories MEM1, MEM2 and the circuit CRYCT are linked together by a data bus DTB and an address bus ADB. The interface circuit INTCT can be of the contact type and comprise for example ISO 7816 contacts (clock, data, supply, ground contacts, etc.). The interface circuit INTCT can also be of the RFID contactless type (Radio Frequency Identification) and comprise an antenna coil RF or an antenna circuit UHF, modulation and demodulation circuits for modulating and demodulating incoming and outgoing data, a clock extractor circuit, etc.

The logic circuits present in secured integrated circuits such as integrated circuits for smart cards, are the subject of various attacks by frauds who try to discover their structure and/or the secrets they contain. They are for example cryptography circuits of DES, AES, RSA, etc. type, microprocessors programmed to execute cryptography algorithms, register banks containing secret keys, etc.

The most advanced hacking methods currently involve injecting errors in an integrated circuit during the execution of so-called sensitive operations, such as authentication operations or operations of executing a cryptography algorithm for example.

Such attacks, referred to as attacks by error injection or fault injection, can occur during so-called sensitive calculation phases, such as during phases of calculating an identification code or during the reading of an encryption key in a memory. They enable, in combination with mathematical models and from false results obtained intentionally thanks to glitches, a secret element such as an encryption key or a password to be defined, the structure of a cryptography algorithm and/or the secret keys the algorithm uses to be deduced, etc.

In particular, localized attacks involve introducing glitches at a determined point of the circuit, for example by means of a laser beam or an X-ray beam. A localized attack can concern the supply voltage, a data path, or the clock signal of the integrated circuit.

The ROM or EEPROM memory of a smart card which generally contains sensitive data or programs are particularly targeted by this type of attack. Although it is impossible to modify the content of a ROM memory, a glitch applied to the output stages or the address decoders of the memory can modify the value of a datum or of a program instruction at the time it is read in the memory or transmitted to the central processing unit.

To counter this type of attack, the possibilities have already been considered of storing, for each datum stored in the memory, control information calculated from the bits of the datum, and of checking every time a datum is read that the control information stored for this datum corresponds to the control information calculated from the bits of the datum read. According to the value of the datum read and the bits affected by the error injection, the control information calculated on the corrupted datum can correspond to the information that is stored for the datum read. Therefore this solution has flaws.

BRIEF SUMMARY

One embodiment provides a more efficient protection of the data read in a memory against attacks by error injection.

One embodiment stores a datum read with its read address and checks that the datum stored corresponds to the datum appearing at the address stored when the memory is not accessed.

One embodiment is a method for reading a datum saved in a memory, the method comprising steps of selecting an address of the memory in which a datum to be read is saved, and of reading the datum in the memory at the selected address.

According to one embodiment of the present invention, the method comprises steps of:

saving the datum read in a storage space, and
when the memory is not accessed, reading the datum in the memory, reading the datum saved, and activating an error signal if the datum read in the memory is different from the datum saved.

According to one embodiment of the present invention, each datum read in the memory is saved in the storage space in association with its address in the memory.

According to one embodiment of the present invention, several data read at consecutive addresses in the memory are saved in the storage space in association with a single address and a number corresponding to the number of data saved in association with the address.

According to one embodiment of the present invention, the data saved in the storage space are checked according to a random order.

According to one embodiment of the present invention, the data read in the memory are saved randomly in the storage space.

According to one embodiment of the present invention, the method comprises a step of interrupting the reading of the memory when the storage space is full, to check whether the data saved in the storage space are identical to the corresponding data in the memory.

According to one embodiment of the present invention, the reading of the memory is interrupted either by blocking the clock signal pacing a central processing unit accessing the memory, or by triggering the execution by the central processing unit of a waiting routine stored in another memory.

The present invention also relates to a device for protecting the reading of a memory. According to one embodiment of the present invention, the device comprises:

a storage space for saving a datum read in the memory, and an address of the memory in association with the datum saved,
means for reading the datum in the memory by using the address saved,
a comparator for comparing the datum saved in the storage space with the datum read in the memory, and
means for activating an error signal if the datum saved is different from the datum read in the memory.

According to one embodiment of the present invention, the storage space stores for each datum saved, the address of the datum in the memory.

According to one embodiment of the present invention, the storage space stores a single address for a set of saved data located at consecutive addresses in the memory, and a number corresponding to the number of data in the set of data.

According to one embodiment of the present invention, the data are saved in the storage space in a stack managed in FIFO or LIFO mode.

According to one embodiment of the present invention, the addresses are saved in the storage space in a stack managed in FIFO or LIFO mode.

According to one embodiment of the present invention, the device is integrated into the memory to be protected.

One embodiment is an integrated circuit comprising a central processing unit and a memory read by the central processing unit. According to one embodiment of the present invention, the integrated circuit comprises a protection device as defined above, to save each datum read in the memory by the central processing unit and to check each datum saved when the central processing unit does not access the memory.

According to one embodiment of the present invention, the protection device comprises a multiplexer disposed on an address bus connected at input to an address bus of the central processing unit and to the storage space, and at output to the address bus of the memory, to apply to the memory a read address coming either from the central processing unit, or from the storage space.

According to one embodiment of the present invention, the protection device comprises means for controlling the reading of the memory when the central processing unit does not access the memory.

BRIEF DESCRIPTION OF THE SEVERAL VIEWS OF THE DRAWINGS

These and other features and advantages shall be presented in greater detail in the following description of an embodiment of the present invention, given in relation with, but not limited to the following figures, in which.

DETAILED DESCRIPTION

Figure 2:
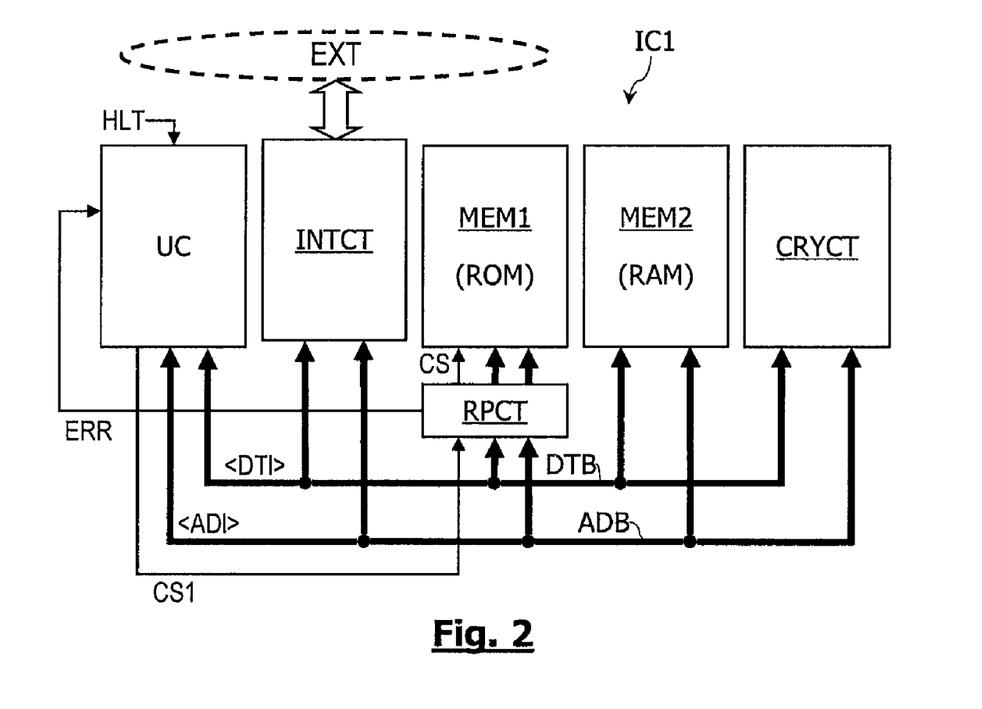
FIG. 2 represents in block form an integrated circuit equipped with a protection device according to the present invention.

FIG. 2 represents an integrated circuit IC1 for smart card or electronic tag. The integrated circuit IC1 comprises a microprocessor central processing unit UC, one or more non-volatile memories MEM1 (ROM, EEPROM, FLASH, etc.), a volatile memory MEM2 (RAM), an encryption circuit CRYCT enabling the integrated circuit to authenticate itself during a transaction, and an interface circuit INTCT enabling it to communicate with external smart card or electronic tag readers (EXT). The central processing unit UC, the memories MEM1, MEM2 and the circuit CRYCT are linked together by a data bus DTB and an address bus ADB. The interface circuit INTCT can be of the contact type and comprise for example ISO 7816 contacts (clock, data, supply, ground contacts, etc.). The interface circuit INTCT can also be of the RFID contactless type (Radio Frequency Identification) and comprise an antenna coil RF or an antenna circuit UHF, modulation and demodulation circuits for modulating and demodulating incoming and outgoing data, a clock extractor circuit, etc.

The integrated circuit IC1 is equipped with a protection device RPCT, detecting errors in the data read in the memory MEM1. The device RPCT is interposed on the input/output data and address buses of the memory MEM1. The device RPCT also receives from the central processing unit UC the selection signal CS1 of the memory MEM1 and transmits to the memory MEM1 an activation signal CS which is determined according to the signal CS1. The device RPCT supplies an error signal ERR which is for example sent to an input of the central processing unit UC.

It shall be noted that the device RPCT can be integrated into the memory MEM1.

Figure 3:
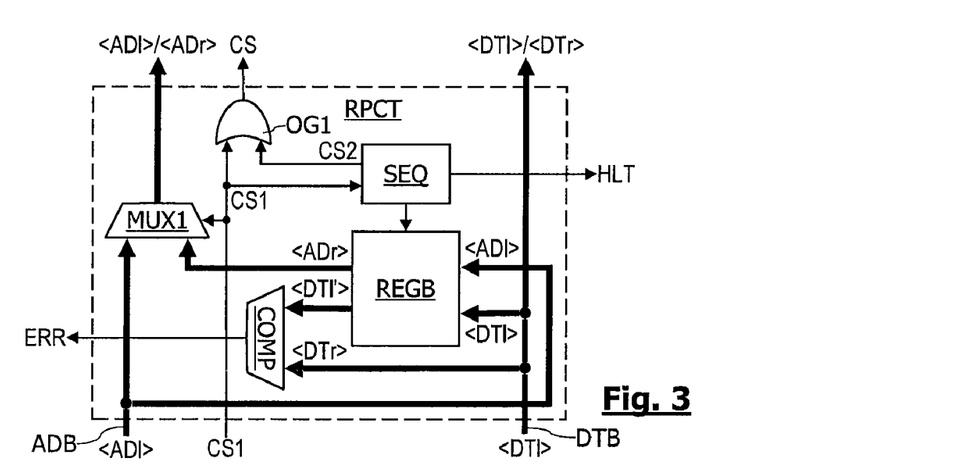
FIG. 3 represents the protection device in block form.

In FIG. 3, the device RPCT comprises a multiplexer MUX1, a sequencer SEQ, a storage space REGB for storing addresses and data read in the memory MEM1, a comparator COMP and an OR-type logic gate OG1. An input of the multiplexer MUX1 is connected to the address bus ADB interconnecting the central processing unit UC and the other circuits (INTCT, MEM1, MEM2, CRYCT) of the integrated circuit IC1. The output of the multiplexer MUX1 is connected to the input of the address bus of the memory MEM1. The storage space REGB is connected at input to the address ADB and data DTB buses. The storage space REGB comprises an address output <ADr> connected to an input of the multiplexer MUX1 and a data output <DTI'> connected to an input of the comparator COMP another input of which is connected to the bus DTB. The comparator supplies the error signal ERR. The sequencer SEQ controls the access to the registers REGB and receives from the central processing unit UC a selection signal CS1 for selecting the memory MEM1. The sequencer SEQ generates a selection signal CS2 for selecting the memory MEM1. The selection signals CS1, CS2 are supplied at the inputs of the gate OG1 the output of which supplies a selection signal CS which is applied to the memory MEM1.

The storage space REGB comprises for example a set of registers each comprising an address field and a data field. Each of the registers in the space REGB consists of n bits, n being equal to the sum of the number of bits of a datum and of the number of bits of an address. The number of registers in the space REGB is not required to be more than a few units. When a datum <DTI> is read by the central processing unit UC in the memory MEM1, it is stored in the data field of one of the registers in the storage space REGB. The address <ADI> at which the datum is read is stored in the address field of the register in which the corresponding datum is stored.

When the memory MEM1 is not accessed by the central processing unit UC (signal CS1 inactive), the sequencer SEQ activates the reading of the memory MEM1 by activating the signal CS2 and by controlling the reading of a datum <DTI'> and of a corresponding address <ADr> in the space REGB. The address <ADr> is applied to the memory through the multiplexer MUX1 and the datum <DTI'> is supplied to the comparator COMP. The datum <DTr> located in the memory MEM1 at the address <ADr> is thus applied to the comparator COMP which compares it with the datum <DTl'> read in the space REGB. If a difference between the data received by the comparator is detected, the signal ERR at output of the comparator changes to the active state, signaling an error in the reading of the memory MEM1.

The error signal ERR is for example sent by the circuit RPCT to the central processing unit UC so as to enable it to take emergency measures in response to the activation of the signal ERR. The error signal ERR can thus be applied to an interrupt decoder that supplies the central processing unit UC with an interrupt vector when the error signal ERR has the active value. The central processing unit then executes a dedicated interrupt handler. Alternatively, the error signal ERR can be applied to a hard-wired logic protection circuit specifically provided for this purpose. The emergency measures, whether they are implemented by an interrupt handler executed by the central processing unit or by an external circuit, can consist for example in causing a hardware reset of the central processing unit, an erasure, destruction or locking of certain parts of the memories, etc.

The storage space REGB advantageously comprises a number of registers enabling all the data corresponding to one or more instructions and to the parameters thereof to be saved. In addition, the program executed by the central processing unit UC is preferably designed so that the number of successive read cycles of the memory MEM1 is lower than or equal to the number of registers in the storage space, and that the number of cycles during which the memory MEM1 is selected (signal CS1 active) is lower than the number of cycles during which the memory is not selected (signal CS1 inactive). This thus avoids the storage space REGB being saturated.

In the opposite case, provision can be made for activating a stop signal HLT when the storage space REGB is full. The signal HLT can be used to stop the clock which paces the central processing unit UC, without stopping the one that paces the memory MEM1 and the device RPCT. Alternatively, the signal HLT can be supplied to the central processing unit UC to trigger an interruption in the program it is executing. When the unit UC is interrupted, the device RPCT can access the memory MEM1 so as to check all the data stored in the storage space REGB. The central processing unit UC can be interrupted in two ways. Either the signal HLT is applied to the central processing unit UC as an interrupt signal, or the central processing unit periodically polls the status of this signal. In the event that the signal HLT is a central processing unit UC interrupt signal, the interrupt vectors are stored in another memory. In the two cases, when the signal HLT is activated, the central processing unit executes a waiting routine during which the central processing unit does not access the memory MEM1. For this purpose, the waiting routine is stored in a memory other than the memory MEM1. The duration of the waiting routine is advantageously adjusted to the duration provided for the phase of checking the data saved by the device RPCT when the storage space REGB is full.

In the following description of embodiments of the device RPCT, various signals that can easily be provided by those skilled in the art have not been described above, only the signals required to understand the present invention being described. Thus, although the signals enabling the registers and the flip-flops of the device RPCT to be initialized have not been described, it goes without saying that such initialization signals must be provided.

Figure 4:
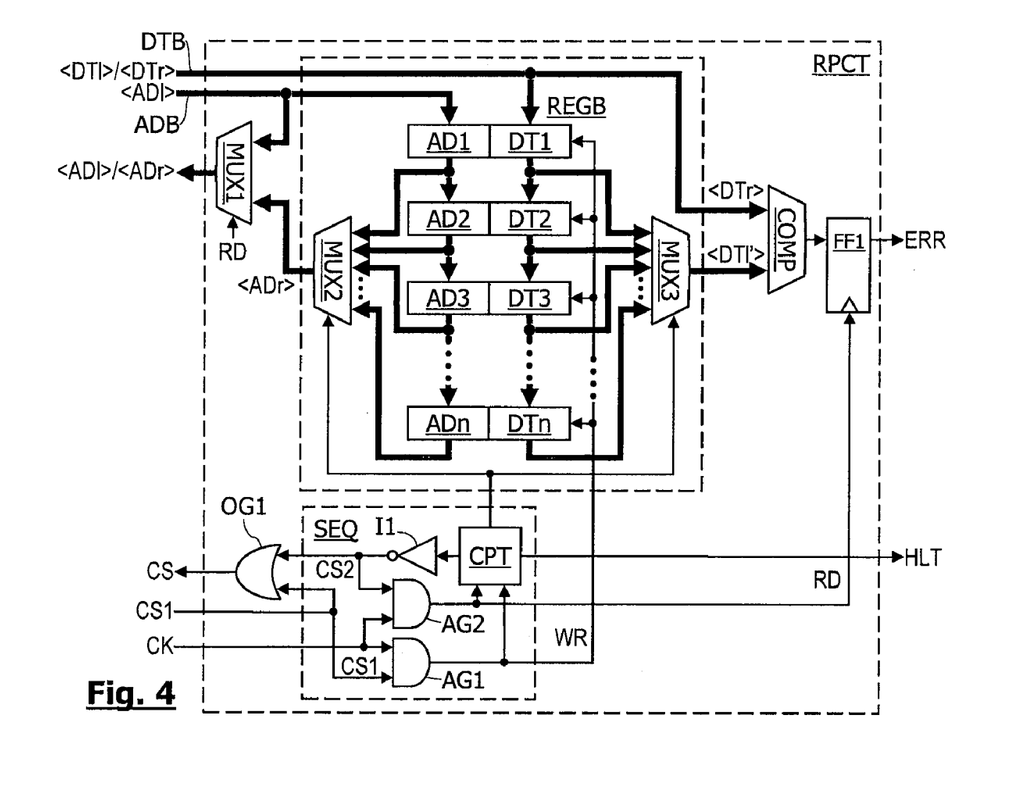
FIG. 4 represents a protection device according to a first embodiment of the present invention.

FIG. 4 represents a first embodiment of the device RPCT and in particular of the storage space REGB and of the sequencer SEQ.

The storage space REGB comprises several address registers AD1-ADn mounted in series each comprising an input and an output, and the same number of data registers DT1-DTn mounted in series each also comprising an input and an output. The input of a first address register AD1 is connected to the bus ADB, and the input of a first data register DT1 is connected to the data bus DTB. The input of each of the other address registers AD2-ADn is connected to the output of a previous address register AD1-ADn-1. Similarly, the input of each of the other data registers DT2-DTn is connected to the output of a previous data register DT1-DTn-1. The output of each register AD1-ADn is also connected to the input of a multiplexer MUX2 the output of which is connected to the input of the multiplexer MUX1. The output of each register DT1-DTn is connected to the input of a multiplexer MUX3 the output of which is connected to the input of the comparator COMP.

The address AD1-ADn and data DT1-DTn registers are managed in the same way as a FIFO-type (First In, First Out) stack: every time a new datum and its address are stored in the first registers AD1, DT1, the content of the registers is shifted in the same direction (from AD1 to AD2 and from DT1 to DT2).

The sequencer SEQ comprises a counter CPT which controls the multiplexers MUX2 and MUX3 so as to successively read the registers. The sequencer also comprises two AND-type logic gates AG1, AG2 receiving a clock signal CK pacing the reading of the memory MEM1. The gate AG1 receives the selection signal CS1. The counter supplies an overflow signal when it is on 0, this signal being inverted by an inverter 11 to produce the signal CS2 which is supplied to the gate AG2. The gate AG1 supplies a write command signal WR and the gate AG2 supplies a read command signal RD. The signals RD and WR control the counter CPT. The signal RD controls the multiplexer MUX1. The signal WR controls the writing of the registers AD1-ADn and DT1-DTn.

The device RPCT comprises a flip-flop FF1 receiving the output signal of the comparator COMP and the signal RD on a clock signal input, and supplying the error signal ERR. The flip-flop FF1 enables the signal ERR to be synchronized with the read cycles and the activation of the signal ERR to be stored in the event that an error is detected.

When the central processing unit UC reads a datum in the memory MEM1 (signals CS1 on 1, CS2 on 0, RD on 0 and WR on 1), the datum read and the read address are respectively stored in the register DT1 and in the register AD1. Before another address and another datum are stored in the registers AD1 and DT1, the contents of the registers AD1-ADn-1 and DT1-DTn-1 are transferred into the next registers AD2-ADn and DT2-DTn. The contents of the last registers ADn and DTn are thus lost. The counter CPT is incremented by 1 upon each new write in the registers AD1 and DT1 by the signal RD on 1. If during a cycle, the memory MEM1 is not read (CS1=0 when CK changes to 1), the signals CS2 and RD change to 1 and the signal WR changes to 0. The counter CPT is then decremented by 1 and the register the position of which corresponds to the value of the counter is read by the multiplexers MUX2, MUX3. The address <ADr> contained in the address register read is thus sent to the memory MEM1 by the multiplexer MUX2, and the datum <DTl'> contained in the data register read is supplied to the comparator COMP. The datum <DTr> read in the memory MEM1 at the address <ADr> is sent to the other input of the comparator COMP.

The flip-flop FF1 stores the status of the signal ERR at output of the comparator upon the rising edge of the signal RD.

To avoid losing data every time the content of the registers AD1-ADn, DT1-DTn is shifted, the data stored in the storage space REGB can be read and checked at a faster rate than the reading of the memory MEM1 by the unit UC, if the memory so enables. Alternatively, the program executed by the central processing unit may comprise waiting loops stored in another memory (activated by another selection signal). Another solution consists in generating a signal HLT when the counter reaches the value of the number n of registers AD1-ADn or DT1-DTn. The signal HLT is sent to the central processing unit UC or to the general clock of the integrated circuit IC1 (distinct from the clock which paces the re-reading of the memory MEM1 and the flip-flop FF1), so as to interrupt the execution of the program and to enable the device RPCT to check the data stored in the storage space. When all or part of the data stored in the storage space REGB have been checked (value of the counter CPT lower than n), the signal HLT changes back to 0 to enable the unit UC to pursue the execution of the program.

Figure 5:
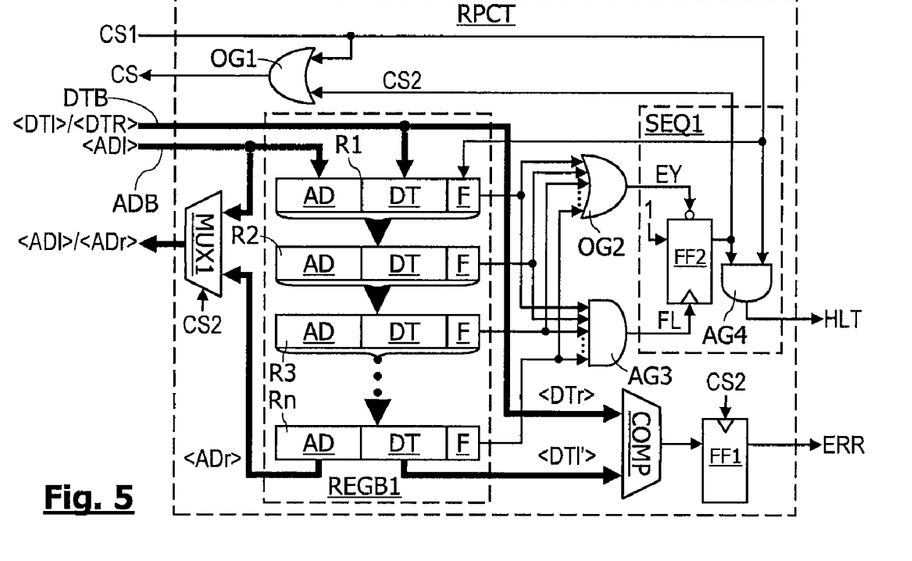
FIG. 5 represents a protection device according to a second embodiment of the present invention.

FIG. 5 represents another embodiment of the device RPCT. In FIG. 5, the device RPCT comprises, just like the device represented in FIG. 3, a storage space REGB1, a sequencer SEQ1, the multiplexer MUX1, the comparator COMP, the flip-flop FF1 and the gate OG1. The storage space REGB1 comprises several registers R1-Rn each comprising an address field AD, a data field DT and a status field F indicating whether the register is free or busy. The address field AD of a first register R1 is connected at input to the address bus ADB, the data field DT of the register R1 is connected at input to the bus DTB, and the field F of this register receives the value of the selection signal CS1. Each of the registers R1-Rn-1 except a last register Rn comprises an output connected to the input of a next register R2-Rn. The last register Rn comprises an address output connected to an input of the multiplexer MUX1, and a data output connected to an input of the comparator COMP. When the register R1 is write-accessed, the status field F of this register is set to 1. The registers R1-Rn are managed in the same way as a FIFO-type (First In, First Out) stack.

The device RPCT also comprises an AND-type logic gate AG3 and an OR-type logic gate OG2, each receiving at input the value of each of the status fields F of the registers R1-Rn. The output of each of the logic gates AG3, OG2 is connected to the sequencer SEQ1. The output of the gate AG3 supplies a signal FL on 1 when all the registers in the set REGB1 are busy (field F on 1). The output of the gate OG2 supplies a signal EY on 0 when all the registers in the set REGB1 are free (field F on 0).

The sequencer SEQ1 supplies a signal HLT which changes to 1 when all the registers in the set REGB1 are busy and which changes to 0 when all the registers R1-Rn are free.

When all the registers are full (signal FL on 1), if the program executed by the central processing unit UC does not access the memory MEM1 upon the next read cycle, the oldest datum stored in the register Rn is checked. If the program tries to access the memory MEM1 upon the next read cycle, the signal HLT changes to 1, which interrupts the execution of the program by the unit UC.

The sequencer SEQ1 controls the set of registers REGB1 to trigger the reading of the first register written (register Rn), and thus compare the datum <ADI'> stored in the register with the datum <ADr> read in the memory MEM1 at the address <ADr> stored in the register Rn. Every time a register is read, the content of the registers R1-Rn is shifted. Every time the content of the registers is shifted, the content of the field F of the first register R1 is put to 0. When the signal EY changes to 0, all the data stored in the registers R1-Rn have thus been checked, and the signal HLT changes to 0.

The sequencer SEQ1 can be produced using a flip-flop FF2 the input of which is forced to 1 and using an AND-type logic gate AG4. The signal FL is transmitted to the clock signal input of the flip-flop FF2 to trigger the flip-flop when the signal FL changes to 1. The signal EY is transmitted to an initialization input of the flip-flop FF2 to initialize the latter when the signal EY changes to 0. The direct output of the flip-flop FF2 supplies the signal CS2 which is sent to an input of the gate AG4. The gate AG4 also receives at input the signal CS1 and supplies the signal HLT. Thus, the signal HLT changes to 1 when the signals CS1 and CS2 are simultaneously on 1.

Figure 6:
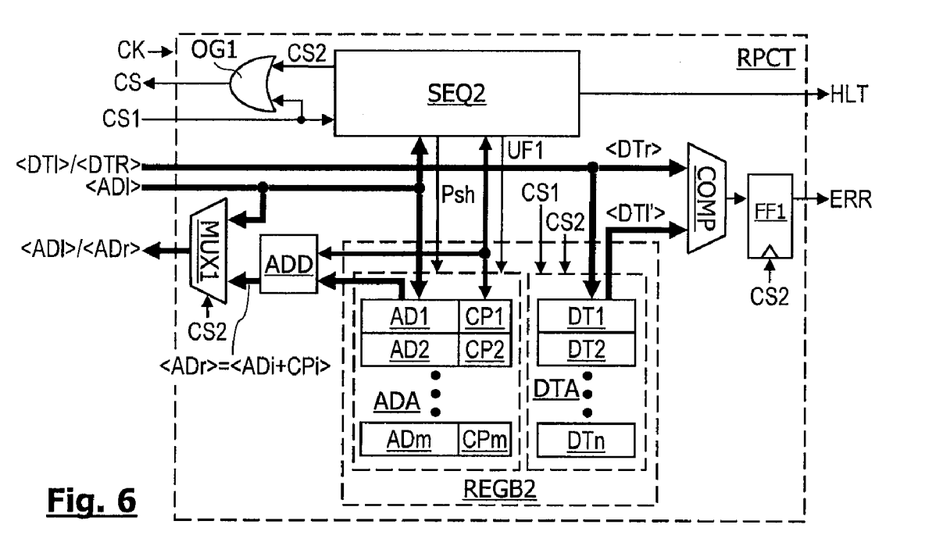
FIG. 6 represents a protection device according to a third embodiment of the present invention.

FIG. 6 represents another embodiment of the device RPCT. In FIG. 6, the device RPCT comprises, just like the device represented in FIG. 3, a storage space REGB2 for storing the data to be checked with their addresses, a sequencer SEQ2, the multiplexer MUX1, the comparator COMP, the flip-flop FF1, and the gate OG1.

The storage space REGB2 comprises an address storing stack ADA and a data storing stack DTA, both stacks being managed in LIFO (Last In-First Out) mode. The stack ADA can store m addresses AD1-ADm each in association with the value of a counter CP1-CPm. The stack DTA can store n data DT1-DTn, n being equal to m times the maximum counting value of the counters CP1-CPm.

The device RPCT also comprises an adding circuit to add the value of the last address AD1 stored in the stack ADA to the value of the associated counter CP1. The output of the adder ADD is connected to the input of the multiplexer MUX1. Thus, the address <ADr> which is supplied by the multiplexer MUX1 is equal to AD1+CP1.

When the memory is being read, the address stack ADA is shifted down upon each rising edge of a signal Psh supplied by the sequencer SEQ2, and the data stack DTA is shifted down upon each rising edge of the signal CS1. When the data stored in the storage space REGB2 are checked, the address stack ADA is shifted up upon each rising edge of a signal UF1 supplied by the sequencer SEQ2, and the data stack DTA is shifted up upon each rising edge of the signal CS2.

Figures 7, 8:
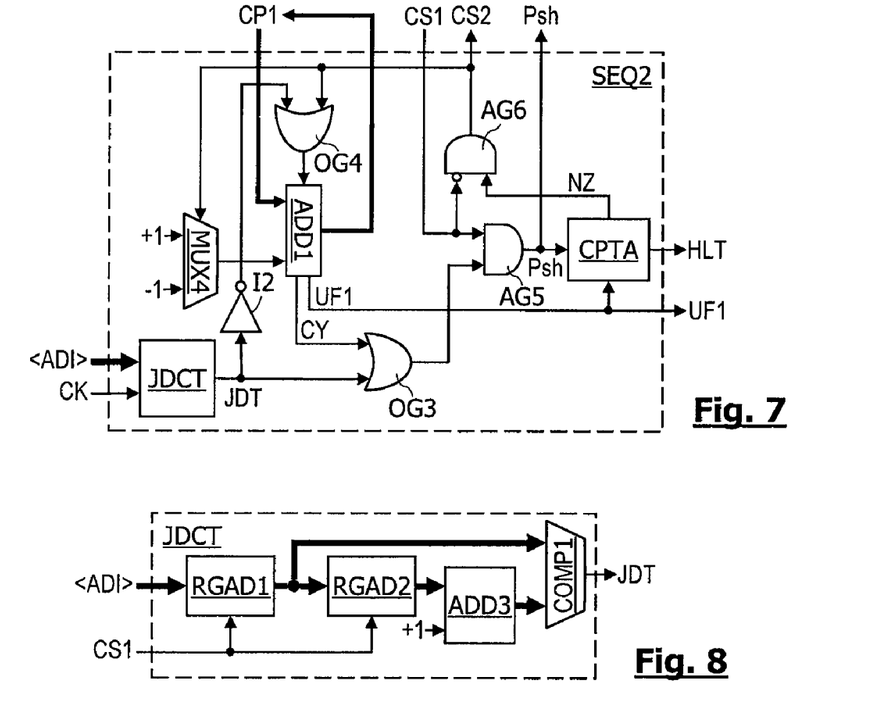
FIG. 7 is an electronic diagram of a sequencer circuit of the protection device represented in FIG. 6.
FIG. 8 is an electronic diagram of a circuit of the sequencer circuit represented in FIG. 7.

FIG. 7 represents one embodiment of the sequencer SEQ2. The sequencer SEQ2 comprises an address jump detector circuit JDCT, an adder ADD1, an inverter I2, an OR-type logic gate OG3, two AND-type logic gates AG5, AG6, and an address counter CPTA. The sequencer SEQ2 also comprises a multiplexer MUX4, and an OR-type logic gate OG4. The circuit JDCT detects the address jumps when the memory MEM1 is read, and supplies a jump detection signal which is sent to the input of the inverter I2 and to the input of the gate OG3. The output signal of the inverter I2 is sent to an input of the gate OG4 the output of which enables the adder ADD1 to be triggered.

The adder ADD1 receives on an input the value of the first counter CP1 of the stack ADA and on another input, a value equal to +1 or −1 selected by the multiplexer MUX4. Every time the adder ADD1 is triggered, it supplies at output the value of the counter CP1 incremented or decremented by 1, which is written in the storing zone of the counter CP1 in the stack ADA. The adder ADD1 supplies a carry signal CY which is activated when the adder overflows, i.e. when the counter CP1 exceeds its maximum value. The signal CY is supplied at the input of the gate OG3. The output of the gate OG3 is connected to the input of the gate AG5 the output of which supplies the signal Psh sent by the sequencer SEQ2 to the stack ADA. The signal Psh is sent to the input of the counter CPTA to trigger a count. The signal CS1 is sent to an inverted input of the gate AG6 the output of which supplies the signal CS2. The signal CS2 is sent to an input of the gate OG4 and to a control input of the multiplexer MUX4. Thus, the value of the counter CP1 is incremented or decremented by 1 every time it is triggered according to the value of the signal CS2 controlling the multiplexer MUX4. The adder ADD1 supplies a capacity underflow signal UF1 which is activated when the adder underflows, i.e. when the counter exceeds its minimum value, i.e. 0. The signal UF1 triggers a countdown of the counter CPTA. The counter CPTA supplies a signal NZ which is activated when the counter is no longer on 0, and a capacity overflow signal corresponding to the signal HLT supplied by the sequencer SEQ2. The signal NZ is supplied to the input of the gate AG6.

When the integrated circuit is initialized, the entire storage space REGB2 is empty. Upon the first read in the memory MEM1, the read address <ADI> in the memory MEM1 is stored in a first register AD1 of the address stack ADA and the associated counter CP1 is incremented by 1. The datum <DTI> read in the memory MEM1 at the address <ADI> is stored in a first register DT1 of the data stack DTA.

Upon the second read in the memory MEM1, if the address read is equal to the previous read address <ADI> incremented by 1 (signal JDT on 0), the read address is not stored, but the counter CP1 associated with the first location of the zone ADA is incremented, and the new datum <DTI> read in the memory MEM1 is stored in the first register DT1 of the data stack DTA after shifting the latter. Thus, while successive addresses are read in the memory MEM1, no new address is stored in the stack ADA. The counter CP1 is merely incremented and the data read are successively stored in the data stack DTA.

If an address jump is detected by the circuit JDCT (signal JDT on 1), or if the counter CP1 arrives at capacity overflow (signal CY on 1), the signal Psh changes to 1, which triggers a count of the counter CPTA, and a shift of the stack ADA. The read address ADI is then stored in the register AD1 of the stack ADA and the counter CP1 on 0 is incremented by 1 by the adder ADD1. As the counter CPTA is no longer on 0, the signal NZ changes to 1. The result is that if the signal CS1 changes to 0, the signal CS2 changes to 1 triggering a phase of checking the data stored in the stack DTA.

When the address stack ADA is full and the signal CS1 is still on 1, if a count of the counter CPTA is triggered (signal Psh on 1), the count is then in capacity overflow, which makes the signal HLT change to 1.

The result is that when the memory MEM1 is not read or when the signal HLT changes to 1, the data stored in the storage space REGB2 are checked. For this purpose, the sequencer SEQ2 reads the datum stored in the first register DT1 of the stack DTA, as well as the address AD1 and the value of the associated counter CP1 stored in the first register of the stack ADA. The address read AD1 is added by the adder ADD to the value read of the counter CP1. The address thus obtained <ADr> (=AD1+CP1) corresponds to the address in the memory MEM1 of the datum read DT1 in the stack DTA. The comparator COMP compares the datum DT1 with the datum read in the memory MEM1 at the address <ADr>. Every time a datum is read in the stack DTA, the value of the first counter CP1 stored in the stack ADA is decremented by the adder ADD1. When the adder ADD1 supplies a negative result (UF1=1), the counter CPTA is decremented by 1 and the stack ADA is shifted up (signal Psh on 1). When the counter CPTA reaches the value 0, the signal NZ changes to 0, which causes the signal CS2 to change to 0.

FIG. 8 represents one embodiment of the circuit JDCT. The circuit JDCT comprises two address registers RGAD1, RGAD2 in series, an adding circuit ADD2 and a comparator COMP1. The register RGAD1 is connected to the address bus ADB of the integrated circuit IC1. The register RGAD2 is connected to the output of the register RGAD1. The output of the register RGAD2 is connected to an input of the adder ADD2 another input of which receives the value 1. The registers RGAD1 and RGAD2 are write-controlled by the signal CS1. Thus, at the start of each program memory read cycle, indicated by the signal CS1, the register RGAD1 is loaded with the address circulating on the address bus ADB, and the register RGAD2 is loaded with the address stored in the register RGAD1 upon the previous read cycle. The address saved in the register RGAD2 is incremented by 1 by the adding circuit ADD2, then applied to an input of the comparator COMP1. The address saved in the register RGAD1 is applied to another input of the comparator COMP1. Thus, the signal JDT supplied by the comparator COMP1 indicates whether or not the last two successive read addresses of the memory MEM1 are consecutive.

At the start of the execution of a program, further to the initialization of the circuit JDCT, the two registers RGAD1 and RGAD2 save an initial value which does not correspond to the first read address of the program memory MEM1. It is therefore preferable to inhibit the circuit during two read cycles required to load the register RGAD2 with the first program memory MEM1 read address.

The storing and checking mechanisms implemented by the device RPCT are deterministic. If it is possible to reproduce an error injection at the time of checking a datum previously read in the memory MEM1, the error injection will not be detected. Although such an attack appears difficult to perform since the same error must be injected twice at precisely the moments at which a datum is read then checked in the memory MEM1, it can be advantageous to remove this risk of not detecting an error injection.

Figure 9:
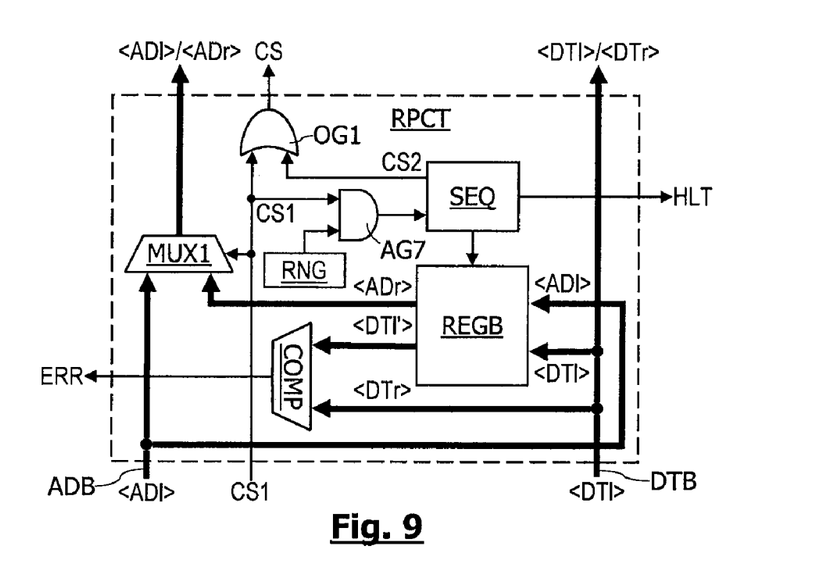
FIG. 9 represents a protection device according to a fourth embodiment of the present invention.

From this perspective, FIG. 9 represents another embodiment of the protection device according to the present invention. In this embodiment, the protection device RPCT comprises one of the circuits RPCT previously described with reference to FIGS. 3 to 6. The protection device also comprises a random binary data generator RNG connected to an input of an AND-type logic gate AG7 another input of which receives the selection signal CS1. The output of the gate AG7 is connected to an input of the signal CS1 of the sequencer SEQ (SEQ, SEQ1 or SEQ2). Thus, the data which are read in the memory MEM1 and which are supplied to the circuit RPCT are chosen randomly. Thus, all the accesses to the memory MEM1 are not saved and therefore not verifiable.

Alternatively, a random component can be introduced, not in the storing of the data and addresses read in the memory MEM1, but in the sequencer SEQ (or SEQ1) to act on the order according to which the data and addresses are read in the storage space REGB (or REGB1) during the checking phase.

To modify the order according to which the data are read in the storage space, the counter CPT represented in FIG. 4 can for example be initialized with a random value, so as to randomly choose the first datum to be checked. In this case, a second counter is provided to count down the number of data to be checked and stop the checking phase when all the data saved have been checked.

In the event that the storage space is write- or read-accessed in a random manner, it can be produced using a memory each location of which is individually addressable.

In all the embodiments previously described, provision can be made to check the same datum in the memory MEM1 several times, so as to improve the extent of the checking and to avoid attacks by synchronization. The number of checks of the same datum is chosen randomly. In the embodiments in which the storage space (REGB1 or REGB2) is a FIFO or LIFO stack (FIGS. 5 and 6), the stack is disabled when it is re-read, when other checks of the same datum are performed.

It will be understood by those skilled in the art that various alternative embodiments and applications of the present invention may be made. In particular, the present invention may be applied to any type of non-volatile memory, and not only to program instructions, given that the data saved in the storage space must not be modified between the moment they are read and the moment they are checked. Therefore, provision can be made for checking the data so as to "empty" the storage space before writing in the memory.

Providing the signal HLT is not essential. Indeed, depending on the applications, it may be acceptable not to check all the data saved in the storage space. Alternatively, the program executed by the central processing unit UC may comprise waiting instructions stored in a memory other than the memory MEM1, to enable the device RPCT to check the data saved in the memory MEM1.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    selecting an address indicating a storage location of a memory;
    reading a first datum from the storage location indicated by the selected address;
    saving in a first storage space the first datum read from the storage location;
    saving in a second storage space, associated with the first storage space, the selected address;
    accessing the selected address from the second storage space;
    reading a second datum from the storage location of the memory using the selected address accessed from the second storage space;
    reading from the first storage space the first datum saved in the first storage space; and
    activating an error signal if the second datum read from the memory is different from the first datum saved in the first storage space.

2. The method according to claim 1, further comprising saving in the first storage space several data read at consecutive addresses in the memory, the several data being saved in the first storage space in association with a single address and a number corresponding to the number of data saved in association with the single address.

3. The method according to claim 1, further comprising:
    reading data at addresses in the memory; and
    saving the data in the first storage space, wherein the data saved in the first storage space are checked according to a random order.

4. The method according to claim 1, further comprising:
    reading data at addresses in the memory; and
    saving the data randomly in the first storage space.

5. The method according to claim 1, comprising:
    reading data at addresses in the memory;
    saving the data in the first storage space;
    determining that the first storage space is full; and
    interrupting the reading of the memory in response to determining that the first storage space is full, and checking whether the data saved in the first storage space are identical to the corresponding data in the memory.

6. The method according to claim 5, wherein the interrupting step includes either blocking a clock signal pacing a central processing unit accessing the memory, or triggering the central processing unit to execute a waiting routine stored in another memory.

7. The method according to claim 1, wherein the reading the datum at the selected address is performed in response to a read request from a central processing unit and the reading the datum from the memory is performed while the central processing unit is not accessing the memory.

8. A device for protecting the reading of a memory, comprising:
    a storage space configured to save a first datum read from a storage location in the memory identified by a selected address, and save the selected address in association with the first datum;
    means for reading a second datum from the memory by using the saved selected address;
    a comparator configured to compare the first datum saved in the storage space with the second datum read from the memory; and
    means for activating an error signal if the first datum saved is different from the second datum read from the memory.

9. The device according to claim 8, wherein the storage space is configured to store data from the memory, and for each datum saved, the address of the datum in the memory.

10. The device according to claim 8, wherein the storage space is configured to store a single address for a set of saved data located at consecutive addresses in the memory, and a number corresponding to the number of data in the set of data.

11. The device according to claim 8, wherein the storage space is configured to store data from the memory, and wherein the data are saved in the storage space in a stack managed in FIFO or LIFO mode.

12. The device according to claim 8, wherein the storage space is configured to store data from the memory and addresses respectively corresponding to the data, wherein the addresses are saved in the storage space in a stack managed in FIFO or LIFO mode.

13. The device according to claim 8, wherein the memory to be protected is integrated with the storage space, means for reading, comparator, and means for activating.

14. An integrated circuit, comprising:
    a central processing unit;
    a memory read by the central processing unit;
    a protection device that includes:
    a storage space configured to save each datum read from the memory by the central processing unit;

means for checking, while the central processing unit is not accessing the memory, the data saved in the storage space, the checking including re-reading the data from the memory, comparing each datum saved in the storage space with a corresponding datum re-read from the memory, and activating an error signal if the datum saved is different from the datum re-read from the memory.

15. The integrated circuit according to claim 14, wherein the protection device comprises a multiplexer having a first input coupled to an address bus of the central processing unit, a second input coupled to the storage space, and an output coupled to an address bus of the memory, the multiplexer being structured to apply to the memory a read address coming either from the central processing unit, or from the storage space.

16. The integrated circuit according to claim 14, wherein the protection device comprises means for controlling the reading of the memory while the central processing unit is not accessing the memory.

17. The integrated circuit according to claim 14, wherein the protection device includes a sequencer having an input coupled to the central processing unit to receive a control signal whenever the central processing unit requests to read from the memory, the sequencer having an output coupled to the storage space and being configured to control writing to the storage space in response to receiving the control signal from the central processing unit 18. The integrated circuit according to claim 14, wherein the storage space is configured to save a first datum read from a storage location in the memory identified by a selected address, and save the selected address in association with the first datum and the means for checking includes:

means for reading a second datum from the memory by using the saved selected address;

a comparator configured to compare the first datum saved in the storage space with the second datum read from the memory; and means for activating the error signal if the first datum saved is different from the second datum read from the memory.

* * * * *